Feb. 9, 1926.
H. E. MUCHNIC
1,572,443
PISTON AND RING CONSTRUCTION
Filed Jan. 12, 1925   2 Sheets-Sheet 1
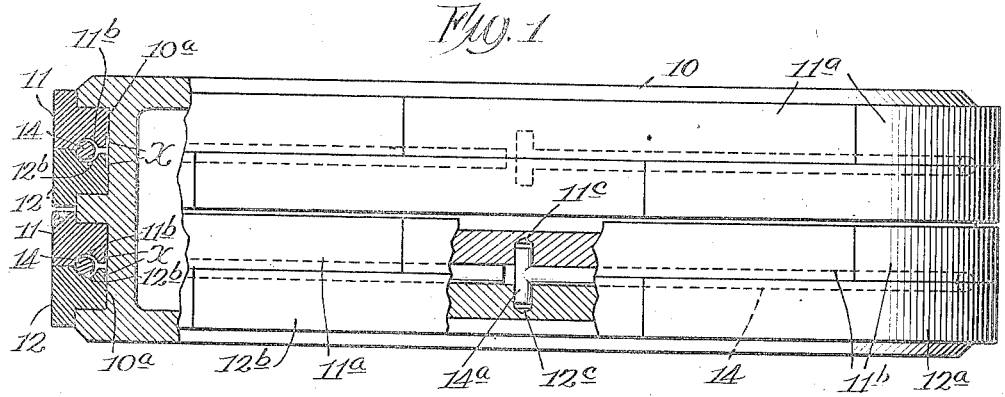
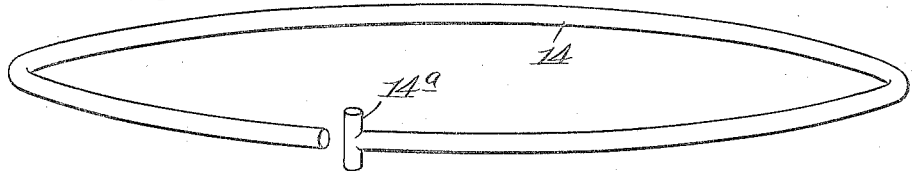
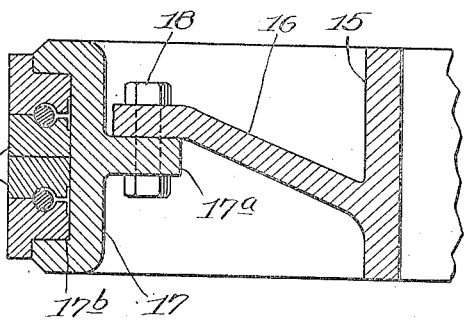
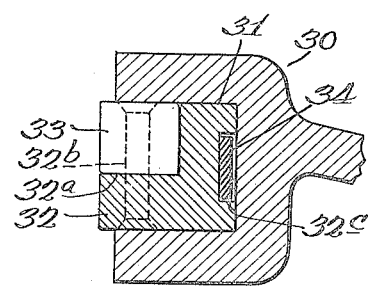
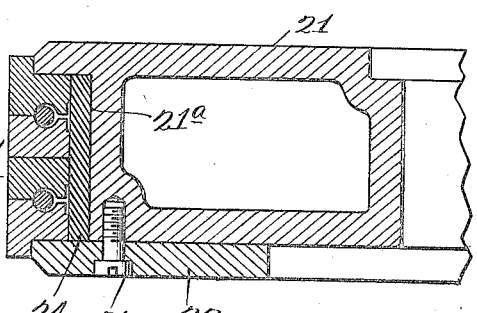
Inventor:
Henry E. Muchnic
By Wallace R. Lane
Atty.

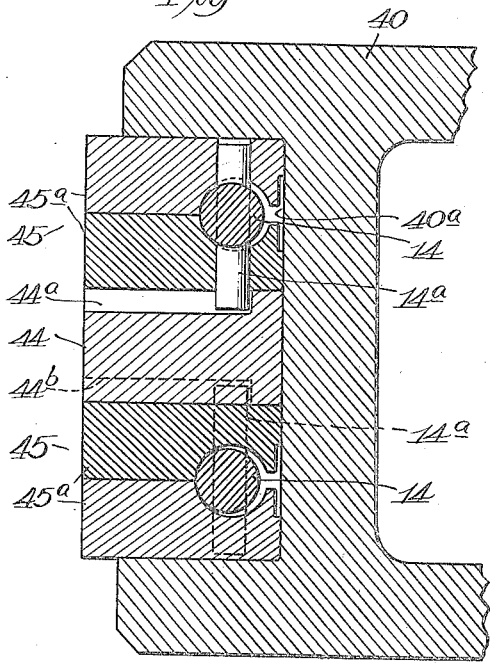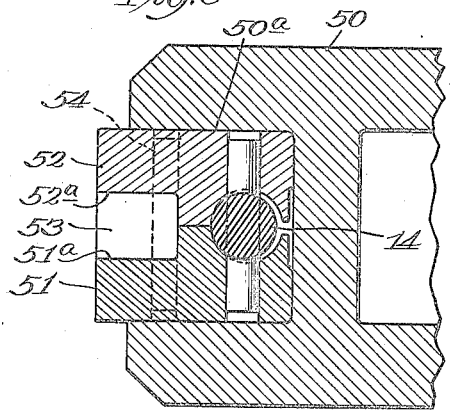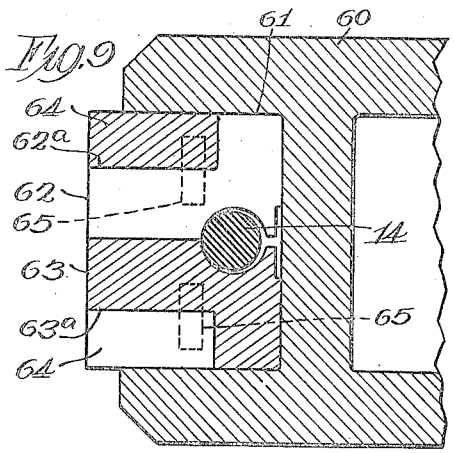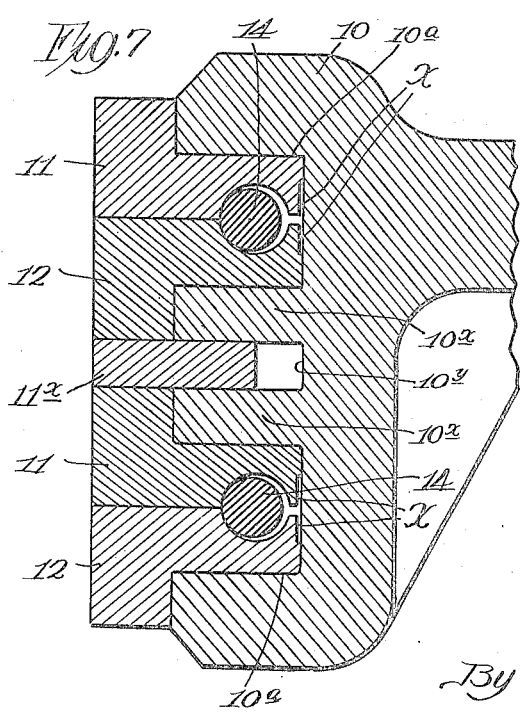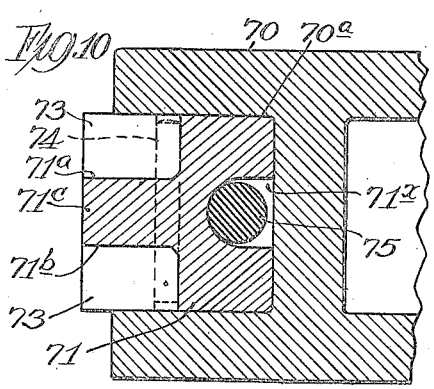

Patented Feb. 9, 1926.

1,572,443

UNITED STATES PATENT OFFICE.

HENRY E. MUCHNIC, OF ATCHISON, KANSAS.

PISTON AND RING CONSTRUCTION.

Application filed January 12, 1925. Serial No. 1,727.

*To all whom it may concern:*

Be it known that I, HENRY E. MUCHNIC, a citizen of the United States, residing at Atchison, in the county of Atchison and State of Kansas, have invented certain new and useful Improvements in Piston and Ring Construction, of which the following is a specification.

This invention relates to piston and ring construction, and has for its object to provide a bull-ring for association with a piston, especially of large size, which ring is constructed in segmental sections, and has associated therewith an extending member which will function to resiliently maintain the bull-ring when assembled on a piston extended against the wall of a cylinder or the like, and compensate for such wear as may occur.

Another object consists in constructing a bull-ring in two parts, each of the parts being formed of segmental sections, the segments of one part overlapping or being staggered with respect to those of the other, to discount leakage through the joints.

Another object resides in the provision of a resilient locking and extending means for use with the latter type of segmental bull-ring, which is constructed for operative engagement with said segments in such wise as to prevent rotative movement of one set of segments relative to the other.

Another object consists in providing a bull-ring of the latter type of construction in which the segments of each part are complementally grooved on their meeting faces to provide a recess for a locking and extending ring, the bottoms of the ring segments being cut away beneath the grooves to eliminate contact with a piston groove over the area directly beneath the ring groove.

This application is a continuation in part of my earlier filed application 666,430 filed October 4, 1923.

These and other objects will be more fully described and set forth in the following specification and shown in the accompanying drawings in which Fig. 1 is a side elevation partly broken away illustrating one form of my invention.

Fig. 2 is a perspective view of one form of locking and extending ring.

Fig. 3 is a vertical section through a portion of a modified form of piston construction.

Fig. 4 is a similar view through another form of piston construction.

Fig. 5 is a similar view of another form of bull-ring and piston construction.

Fig. 6 is a vertical section through a portion of a piston, showing still another form of ring construction.

Fig. 7 is a similar view showing another modified form of bull-ring construction.

Fig. 8 is a similar view, showing still another modification.

Fig. 9 is a similar view, showing still another form.

Fig. 10 is a similar view, showing another form of bull-ring construction.

In the drawings like numerals refer to like elements.

In the form shown in Fig. 1 for example, 10 indicates an integral or one-piece piston having a pair of spaced peripheral grooves $10^a$. Seated in each of these grooves is a segmental bull-ring comprising parts 11 and 12, each of which parts is constructed of a plurality of segments, $11^a$ and $12^a$, the one set being staggered with respect to the other to prevent short circuiting or leakage of steam or other gas when in use.

The meeting faces of the segments $11^a$ and $12^a$ are grooved as indicated by numerals $11^b$ and $12^b$, these grooves being complemental and forming a recess when in assembled relation to accommodate a locking and extending ring 14 formed of spring metal and having the transverse head $14^a$, the ends of which are accommodated in sockets $11^c$ and $12^c$, of a pair of contiguous segments $11^a$ and $12^a$, as shown in Fig. 1. Beneath the recess formed by grooves $11^b$ and $12^b$, the bottoms of the segments 11 and 12 are slightly cut away or recessed as indicated by X. (See Fig. 1, for example.)

In the form shown in Fig. 1, for example, the segments $11^a$ and $12^a$ are outwardly flanged or extended at the sides to substantially overlie the entire peripheral surface of the piston. Also the segments are so constructed that when the piston and rings are assembled and mounted in a coacting cylinder, the rings 11 and 12 will normally contact with the bottom of the grooves $10^a$, so that in horizonal or inclined cylinders, the weight of the piston and associated mechanism will be supported directly upon the bull-ring segments. As the bull-ring or cylinder wears, the segments will be extended to maintain contact with the cylinder wall by means of the locking ring 14, and the latter will also function in the form shown to prevent accidental displacement or removal of the bull-ring segments from assembled relation on the piston. The ring 14 by means of its engagement with a pair of contiguous segments also prevents relative rotative movement of the sets of segments and thereby maintains the overlapping or staggered relation of the same.

In Fig. 3 is shown a generally similar form of segmental bull-ring construction with a different type of piston which comprises a carrying hub 15 and a flange 16 to which is bolted an annular piston portion 17 by means of the flange 17$^a$ and bolts 18. In this form of construction, the piston is provided with a single wide groove 17$^b$, so that the inner segments 20$^a$ of the inner ring parts are constructed without laterally projecting flanges, and directly contact along their side walls, as shown in the drawings. In other respects, the construction is generally similar and needs no extended description thereof.

In Fig. 4 I have illustrated another type of piston designated by numeral 21 in which at one end is mounted a plate 22 attached by means of screws or bolts 23 to the body of the piston 21 to form one wall of the ring groove 21$^a$. This construction is ordinarily designed to permit ready attachment and detachment of a one-piece bull-ring, such as is in general use today. In this construction of Fig. 4, I have shown mounted in the groove 21, an integral non-expansible ring 24, which forms a false bottom for the groove 21$^a$, and which receives the contact from the segmental rings generally indicated by numeral 25. With this type of piston it has been customary to use a solid non-expansible bull-ring which receives the weight of the piston, and consequently is subjected to considerable wear. When this wear becomes appreciable, it is necessary to scrap the bull-ring, which necessitates the removal of the piston, its disassembly, removal of the worn-out bull-ring, and replacement of a new one. In my construction, I may trim down the old bull-ring to the form designated by numeral 24, and use it for a filler ring after which my segmental bull-ring may be readily attached with expenditure of little time and effort.

In the form shown in Fig. 5, I have illustrated a form of light piston 30, having the groove 31, in which is mounted one form of my bull-ring comprising the part 32 segmentally constructed and having a corner recess 32$^a$ in which is mounted the segmental ring 33, one segment of which is pinned to a contiguous segment of ring 32 by means of a pin or shaft 32$^b$.

In this form I have illustrated the main ring as provided with a bottom open groove 32$^c$, in which is accommodated and seats a flat extending expansible ring 34.

In Fig. 6 I have illustrated another type of ring construction in which the piston 40 is provided with a single wide peripheral groove 40$^a$. A central segmental ring 44 is mounted in said groove, one segment of this ring being provided with off-set slots or grooves 44$^a$ and 44$^b$. At either side of the central ring 44 is provided a segmental ring 45, constructed of overlapping complemental segments 45$^a$, being otherwise generally similar in construction to the segmental bull-ring of Figs. 1 to 4, save for the absence of the outwardly extending flanges. Also in this construction, one side of the transverse head 14$^a$ of the locking ring is extended on each side to project into a corresponding slot 44$^a$, thereby locking against relative rotative movement of the segments of the lateral ring sections and the central ring section, as will be obvious.

In Fig. 7 I have illustrated still another form generally similar to the construction shown in Fig. 1, and numbered accordingly. The distinction is that the central peripheral spacing rib 10$^x$ in the piston groove is peripherally grooved as indicated by numeral 10$^y$ to accommodate a one-piece resilient piston ring 11$^x$, which coacts with the bull-ring segments to further resist gas leakage.

In Fig. 8 I have illustrated another modification in which the piston 50 is provided with the bull-ring groove 50$^a$ in which is mounted the segmental bull-ring parts 51 and 52 extended and locked by the resilient ring 14, as in the other forms. The bull-ring construction illustrated in this figure differs from those previously described by the provision of registering complemental corner recesses 51$^a$ and 52$^a$ in the ring segments to accommodate a one-piece resilient piston ring 53, which is secured to a pair of contiguous bull-ring segments by means of the transverse pin 54 illustrated in dotted lines.

In Fig. 9 is illustrated another modification in which the piston 60 is provided with a bull-ring groove or seat 61, in which is mounted the segmental bull-ring parts 62 and 63, generally similar to those of Fig. 8, save that in lieu of arranging the corner recesses as shown in the latter figure at the meeting faces, there are provided corner recesses 62$^a$ and 63$^a$ at the outer faces, and in each of such grooves or recesses I have mounted a resilient one-piece piston ring 64, each of these rings being secured to one of the adjacent bull-ring segments by means of a pin 65.

In Fig. 10 is illustrated another modification in which the piston 70 has a bull-ring groove 70$^a$, in which seats a segmental bull-ring 71, having corner grooves 71$^a$ and 71$^b$ at the outer faces and supported by means of the ridge or rib 71ᶜ thus formed. One-piece resilient piston rings 73 are mounted in these corner grooves and a transverse locking pin 74 extends through one of the bull-ring segments and engages the adjacent piston rings 73, thus locking the piston rings and bull-ring segments against relative rotation. In this form an open bottom groove or recess 71ˣ is provided, in which seats the resilient extending ring 75.

In present day piston and cylinder construction, as stated above, in some classes of service, it has been found that a bull-ring is desirable to receive the wear largely due to the weight of the piston and associated mechanism, this bull-ring being capable of replacement after wear has impaired the efficiency of the mechanism, thus avoiding the discarding or rejection of the entire piston. In my construction, I am enabled in the first place to use an integral or one-piece piston construction, since the bull-ring being segmental and resiliently associated with the extending and locking ring, may be readily fitted to the piston groove without the necessity of providing a removable flange at one side of the groove as in present day construction, or of providing an integral removable ring carrying piston portion.

Since the bull-ring is segmentally constructed and is provided with a resilient extending means, the wear, either in the cylinder or ring is compensated for, and the life of the ring is greatly increased due to this arrangement.

Also, as stated above, in attaching my invention to existing pistons, it is possible to salvage at least a portion of worn integral bull-rings now used, by trimming them down and retaining them to form a false bottom for the bull-ring groove, as illustrated in Fig. 4 of the drawings. Still another advantage of my invention is the saving in time and effort required to remove the bull-ring and to replace the entire ring or segments thereof, as distinguished from present day construction.

It will be obvious that my invention is capable of modification, and I do not wish to be restricted to the forms shown and described, except as described in the appended claims.

What I claim is:

1. In combination with a piston member having a groove in its outer periphery, a bull-ring formed in segmental sections, said sections being constructed to fit in said groove and contact with the bottom thereof, complemental sections associated and coacting with said first named segments, a resilient extending means coacting with said segments, said first named segments and said complemental segments being grooved to accommodate said locking ring, the bottom of said segments beneath said grooves being recessed.

2. In combination with a piston member having a groove in its outer periphery, a bull ring formed in segmental sections and mounted in said groove, an extending means, said bull ring being grooved to accommodate said extending means and constructed to be contacted with the bottom of the piston groove to support the weight of the piston.

3. In combination with a piston member having a groove in its outer periphery, a bull ring formed in segmental sections and mounted in said groove, an extending means, said bull ring being grooved to accommodate said extending means and constructed to be contacted with the bottom of the piston groove at either side of said extending means to support the weight of the piston.

4. In combination a piston having a ring groove in its periphery, a resilient ring mounted in said groove, said ring comprising a pair of complemental sections, each of said sections being formed of segments, complemental segments being provided with an aligning groove, a locking and extending member seated in said groove, a pair of adjacent complemental segments have apertures therein, said locking member being provided with means fitting said apertures whereby relative movement of the ring segments will be prevented.

5. In combination a piston having a ring groove in its periphery, a resilient ring mounted in said groove, said ring comprising a pair of complemental sections, each of said sections being formed of segments, complemental segments being provided with an aligning groove, a locking and extending member seated in said groove, a pair of adjacent complemental segments having apertures therein, said locking member comprising a split ring, one end of said ring being provided with dowel portions fitting said apertures.

In witness whereof, I hereunto subscribe my name to this specification.

HENRY E. MUCHNIC.